(12) United States Patent
Iasi et al.

(10) Patent No.: US 10,133,718 B2
(45) Date of Patent: Nov. 20, 2018

(54) SYSTEMS AND METHODS FOR LOCATING, IDENTIFYING AND MAPPING ELECTRONIC FORM FIELDS

(71) Applicant: FHOOSH, INC., La Jolla, CA (US)

(72) Inventors: Anthony Iasi, San Diego, CA (US); Linda Eigner, La Jolla, CA (US); William Eigner, La Jolla, CA (US); Charles Kahle, Escondido, CA (US); Eric Tobias, La Jolla, CA (US)

(73) Assignee: FHOOSH, INC., La Jolla, CA (US)

( * ) Notice: Subject to any disclaimer, the term of this patent is extended or adjusted under 35 U.S.C. 154(b) by 199 days.

(21) Appl. No.: 14/804,314

(22) Filed: Jul. 20, 2015

(65) Prior Publication Data

US 2016/0019197 A1 Jan. 21, 2016

Related U.S. Application Data

(60) Provisional application No. 62/026,565, filed on Jul. 18, 2014, provisional application No. 62/077,849, filed on Nov. 10, 2014, provisional application No. 62/038,175, filed on Aug. 15, 2014.

(51) Int. Cl.
*G06F 17/24* (2006.01)
*G06N 99/00* (2010.01)

(52) U.S. Cl.
CPC ......... *G06F 17/243* (2013.01); *G06N 99/005* (2013.01)

(58) Field of Classification Search
CPC .................................................. G06F 17/243
See application file for complete search history.

(56) References Cited

U.S. PATENT DOCUMENTS

| 6,192,380 B1 | 2/2001 | Light et al. |
| 6,651,217 B1 | 11/2003 | Kennedy et al. |
| 6,851,087 B1 * | 2/2005 | Sibert ................ G06F 17/2264 715/236 |

(Continued)

FOREIGN PATENT DOCUMENTS

WO 0108416 A2 1/2001

OTHER PUBLICATIONS

International Search Report and Written Opinion dated Oct. 30, 2015 for PCT/US2015/041210 (11 pages).

*Primary Examiner* — Keith D Bloomquist
(74) *Attorney, Agent, or Firm* — Procopio, Cory, Hargreaves & Savitch LLP

(57) ABSTRACT

Systems and methods for locating, identifying, mapping and completing electronic form fields are provided herein. A mapping engine is configured to identify form fields using a variety of similar field names through one or more algorithms configured to identify and match similar field names and combinations of field names. A form field mapping and identification engine identifies a form category using a machine learning classification algorithm, then determines and maps form labels to form fields using seeded values and optical scanning in order to produce a human readable label for each form field. The field labels are used to generate a set of terms for each form field that are used to identify content to be filled in the form with a high degree of accuracy. Additional embodiments are directed toward locating form fields in an electronic form known as a formless form.

17 Claims, 18 Drawing Sheets

(56) References Cited

U.S. PATENT DOCUMENTS

| | | | |
|---|---|---|---|
| 2002/0156846 A1* | 10/2002 | Rawat | G06F 17/243 |
| | | | 709/203 |
| 2005/0257148 A1* | 11/2005 | Goodman | G06F 17/243 |
| | | | 715/226 |
| 2008/0235567 A1* | 9/2008 | Raj | G06F 17/243 |
| | | | 715/226 |
| 2009/0006940 A1 | 1/2009 | Hardt | |
| 2014/0122988 A1 | 5/2014 | Eigner et al. | |
| 2014/0149470 A1* | 5/2014 | Rawal | G06F 17/243 |
| | | | 707/812 |

* cited by examiner

1300

Shipping name: [　　　　　　　　　]

Shipping street: [　　　　　　　　　]

Shipping city: [　　　　　　　　]

Shipping state: [　　　　　　　　] [ Submit ]

The <form> tags normally surround form fields

```
<form>
    <input type="text" name="shipping_name"/>
    <input type="text" name="shipping_street"/>
    <input type="text" name="shipping_city"/>
    <input type="text" name="shipping_state"/>
</form>
```

Shipping name: Anthony Smith

Shipping street: 123 Main street

Shipping city: San Diego

Shipping state: CA    Submit

Personal Information

☐ Yes, I'm an Online Banking customer. Prefill and customize my application with my account information.

First name *      Middle name      Last name *      Suffix
Anthony           F                Tester           Jr Residential address line 1 *          Residential address line 2
123 Main                               Apartment/suite number City *            State *                ZIP code *
San Diego         California             92126-1569

FIG. 16B

SYSTEMS AND METHODS FOR LOCATING, IDENTIFYING AND MAPPING ELECTRONIC FORM FIELDS

BACKGROUND

1. Field of the Invention

Various embodiments described herein relate generally to electronic form filling, and more particularly to locating, identifying, mapping and completing form fields in electronic forms for use in electronic form filling applications.

2. Related Art

The vision of a paperless modern society is quickly becoming a reality, as more and more communications, services and transactions take place digitally across networks such as the Internet. The need for paper copies of correspondence, financial documents, receipts, contracts and other legal instruments is dwindling as electronic methods for securely transmitting, updating and accessing these documents increases. In addition to the electronic transmission and access to documents and correspondence, the process of electronically submitting information is also commonplace, such as with online shopping or applications for loans, credit cards, health insurance, college or job applications, etc.

However, much of the information required in these forms is common to other forms, and yet users manually repeat populating the form inputs with the same information over and over again. Although conventional form filler applications (e.g., Google Chrome®) have been able to alleviate some of this tedium and repetitiveness, more and more websites are implementing changes to the design of their webpages that thwart the proper operation of these conventional form filler applications.

There are two main reasons why conventional form filler applications are failing. First, a form filler application must be able to successfully locate substantially all the fields in a form. Second, after successfully locating the form fields, a form filler application must then be able to accurately identify each form field so that the correct information can be entered. But conventional form filler applications struggle with form field identification because they depend on a static set of form field attributes to determine the appropriate information for each field. On the one hand, form fields can be ascribed attribute values that are ambiguous (e.g., an identical or similar form field name for multiple form fields), meaningless (e.g., form field IDs that are random alphanumeric values), or even misleading. Consequently, conventional form filler applications cannot correctly identify form fields on a consistent basis.

Thus, despite the availability of conventional form filler applications, the ability to effectively collect, organize, update, utilize, and reapply the input information required to complete electronic documents, such as web forms, PDFs and applications, remains elusive.

SUMMARY

Disclosed herein are systems and methods for locating, identifying, mapping and completing electronic form fields using multiple field terms. Multiple field terms may be identified and mapped using a mapping engine configured to identify form fields with a variety of similar field names regardless of whether the field names are identical matches through one or more algorithms configured to identify and match similar field names and combinations of field names. Furthermore, the context and structure of a form will be analyzed to identify unique form fields which use the same field name. The mapping algorithms may be improved over time and use a variety of approaches, such as machine learning and artificial intelligence methods, to associate field names with field values to be input into the form fields.

In another embodiment, a form field mapping and identification engine identifies a form category using a machine learning classification algorithm, then determines and maps form labels to form fields using seeded values and optical scanning or image capture in order to simplify the mapping process for form filling and potentially produce an enhanced field name that incorporates a human readable label associated with each field. Along with additional categorical information, the field labels are used to generate a set of terms for each form field that are used to identify content to be filled in the form with a high degree of accuracy.

In a further embodiment, the systems and methods described herein are directed toward locating form fields in an electronic form known as a "formless form." Additional embodiments of the systems and methods described herein are directed toward identifying form fields using dynamic form field identifiers.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

FIG. 13C is an image of a formless form to be completed, according to one embodiment of the invention;

FIG. 15B is an image of HTML code used for a form-based form to identify the code of a form, according to one embodiment of the invention;

FIG. 15C is an image of the formless form that had been filled in using the formless form identification system, according to one embodiment of the invention;

FIG. 16B is an image of a completed formless form, according to one embodiment of the invention.

The various embodiments mentioned above are described in further detail with reference to the aforementioned figured and the following detailed description of exemplary embodiments.

DETAILED DESCRIPTION

The embodiments described herein provide for locating, identifying, mapping and completing electronic form fields. In one embodiment, a mapping engine is configured to identify form fields using a variety of similar field names regardless of whether the field names are identical matches through one or more algorithms configured to identify and match similar field names and combinations of field names. Furthermore, the context and structure of a form will be analyzed to identify unique form fields which use the same field name. The mapping algorithms may be improved over time and use machine learning and artificial intelligence methods to associate field names with field values to be input into the form fields.

In another embodiment, systems and methods are provided for identifying and labeling form fields using machine learning algorithms. A form field mapping and identification engine identifies a form category using a machine learning classification algorithm, then determines and maps form labels to form fields using seeded values and optical scanning in order to simplify the mapping process for form filling and potentially produce an enhanced field name that incorporates a human readable label associated with each field. Along with additional categorical information, the field labels are used to generate a set of terms for each form field that are used to identify content to be filled in the form with a high degree of accuracy.

In yet another embodiment, systems and methods are provided for locating form fields in an electronic form known as a formless form. Additional embodiments of the systems and methods described herein are directed toward identifying form fields using dynamic form field identifiers.

I. Multiple Term Form Field Identification

As we all have experienced when using a search engine to search for a certain topic, providing more keywords in a search query generally results in more precise search results.

This same concept applies to form fields. Naming a form field with unique and highly relevant terms will make it easier for a form filler to locate the appropriate value for the field. It's possible that a field could be accurately named using a single term. In other cases, multiple terms may be needed.

As such, this concept does not preclude the use of a single term to name fields in a document. A single term could, in fact, be sufficiently concise to properly map a document field to a location in a database containing the value for that field.

For example, consider a form field named FIRSTNAME. The mapping from the form field 102 to the database 104 would look like the diagram in FIG. 1. In a certain number of forms, FIRSTNAME would be referring to the user's first name and the form filler will assume that.

Figure 2:
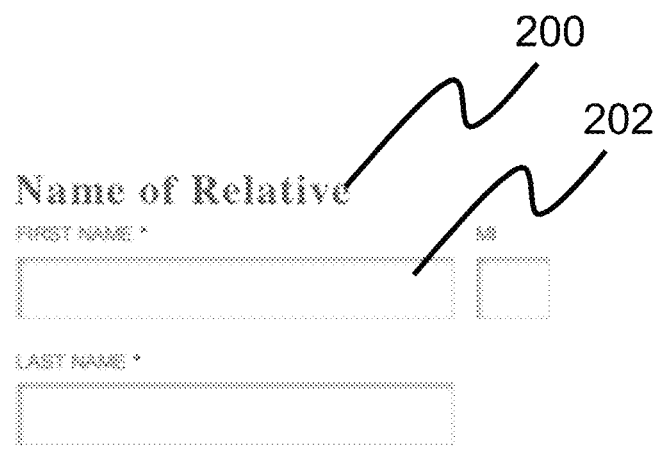
FIG. 2 is an image of an electronic form with a plurality of form fields, according to one embodiment.
Figure 3A:
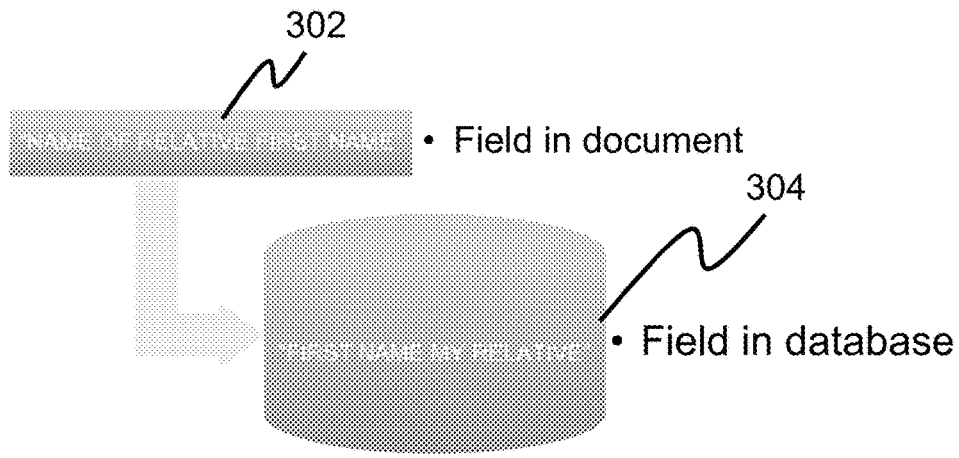
FIG. 3A is a block diagram illustrating a multiple term mapping function, according to one embodiment.

But what if that same form field 202 exists within a section 200 called "Name of Relative," as shown in FIG. 2? In this second situation, the form filler will need help (i.e., a more descriptive field name) to more precisely search for the appropriate value. This is similar to the analogy where a search engine gives you better results when you provide more keywords. By naming the field "NAME OF RELATIVE FIRST NAME," the form filler has a far better chance of filling the field with the correct value. Using multiple terms to identify a field would look like the diagram in FIG. 3A, where form field 302 is labeled "Name of Relative First Name" and may be more easily mapped to the correct field name and corresponding field value in database 304, even though the field name in database 304, "First Name My Relative," is not identical to that of form field 302.

Figure 3B:
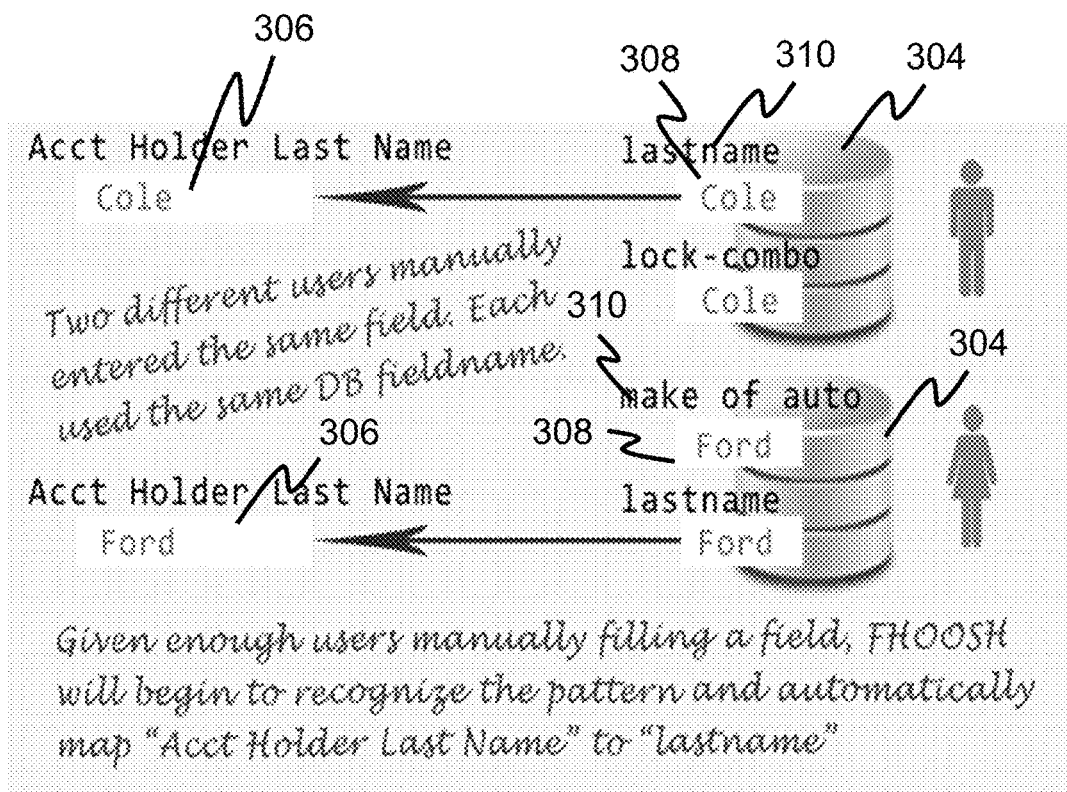
FIG. 3B is an example of a multiple term mapping example where two users fill in different values for the same field, according to one embodiment.

When employing multiple term mapping it is important to note that the terms in the form field do not necessarily need to precisely match the terms in the database. The mapping engine is able to use any number of probabilistic search or other matching algorithms, such as those described in U.S. Ser. Nos. 14/061,734, 14/061,735, 14/061,736, 14/061,740, 14/061,743 and U.S. Ser. No. 14/061,748, the contents of which are incorporated by reference herein in their entirety, or artificial intelligence frameworks such as machine intelligence. An example of the application of one matching algorithm is shown in FIG. 3B, where two different people manually fill the same field 306 "Acct Holder Last Name" using their last name as the value ("Cole" and "Ford," respectively). The mapping engine is able to "learn" through the matching algorithm that takes note of the value entered into the "Acct Holder Last Name" form field and locates the same value in the users' profile databases 304, where the value 308 is already associated with the field name 310 "lastname." Once that value is located, the associated field is known and may be used to automatically map a value to the field for subsequent users. A key aspect of this technology is that it will improve the mapping accuracy as more users initially enter the appropriate values manually. As shown in the illustration in FIG. 3B, two users were required to enter their corresponding last names before the system was able to determine the actual mapping for the field "Acct Holder Last Name."

Multiple Term Mapping (MTM) supports a continuum of mapping engines ranging from a simple single term literal match method all the way up to advanced machine intelligence frameworks. As more advanced mapping technologies are developed, it will be possible to easily incorporate those technologies without having to re-design the mapping applications (extensions, form fillers, etc.) or having to re-map existing forms.

Existing form fillers all perform a simple field name match and lookup between the field of a form and the data stored in the program (either in a database or in a file in memory). The field name on the form must match exactly a field in the database in order for the field to be filled. This is a very rigid approach and does not allow for improvements to the mapping technology over the life of the system. In contrast, an MTM-based form filler will use a best-fit algorithm to match the closest and best matching value for the field. MTM supports a range of mapping algorithms that can be improved over time.

MTM-based form fillers do not need form field names to exactly match the corresponding fields stored in the database. This results in a higher number of fields being filled. For example, a field name on a form could be "Child's Birth Date." In the database, the required value for this field could be stored in a location named "Birthdate of child." This new approach dramatically reduces the number of combinations or "entanglements" needed to store the same data value for the numerous permutations of field names. This results in less memory storage and a vast reduction in duplicated or redundant data.

In one embodiment, the system utilizes machine learning methods to accurately associate database values to form fields. Fields are matched using a scalable learning engine that improves over time as the mapping engine learns how to map form fields by analyzing the field values entered into those form fields. The learning engine may also be adapted with more advanced machine language systems which consider the accuracy and reliability of individual users and weight each user's mapping accordingly.

Conventional form fillers that are based on exact field name matches quickly hit a limit to the number of fields they can map. Multiple-Term based form fillers have no limit to the number of uniquely mapped fields since you can always add more terms to a field to give it a unique mapping. For example, a medical history form may have several fields for entering a list of ailments and dates of occurrence. The field names for each ailment in the form may be sequentially named "date1," "date2," "date3" and so on. Form Field Mapping and Identification (FFMI, described below) may utilize multiple terms to assist the MTM mapping engine in accurately entering the correct date corresponding to the ailment. For example, "date first heart attack," "date last ear infection," and "date most recent pneumonia."

MTM makes it possible to develop Automatic Form Mappers such as Form Field Mapping and Identification (FFMI), as will be described in detail below. This is because fields in the form can be assigned unique names that are based on the form's structural composition. Conversely, using a single term for each field value can be challenging especially when trying to come up with unique names for each field (possibly thousands) in the document. One document could have several fields that are called "FIRST-NAME" all referring to different values for the first name (e.g., "patient first name," "spouse first name" or "physician first name").

Figure 4A:
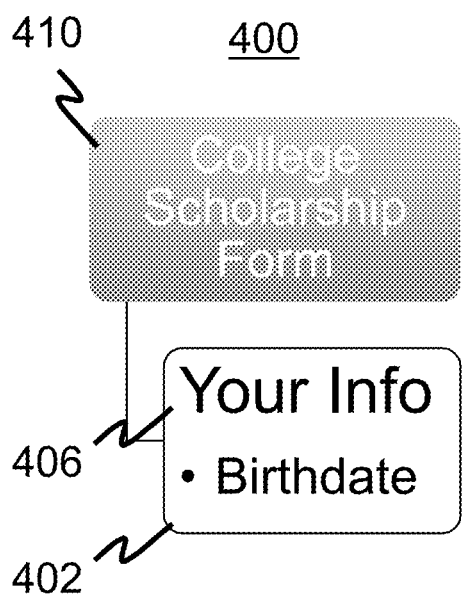
FIGS. 4A-4B are block diagrams illustrating a document hierarchy for an electronic form, according to one embodiment.
Figure 4B:
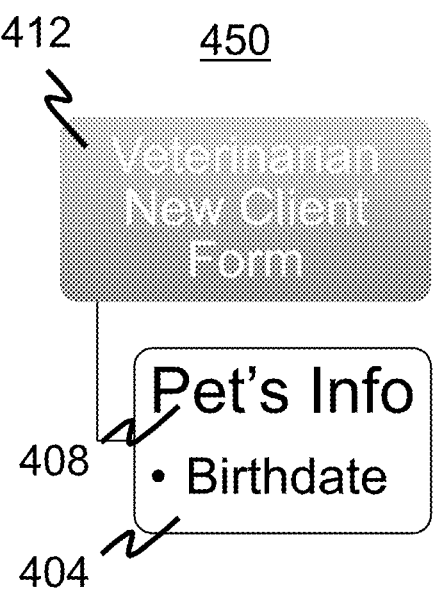

MTM's support for automatic form mapping is a direct result of how all documents can be decomposed into a hierarchical structure. For example, the highest point of the hierarchy could be the category of the document. i.e. medical intake form, college application form, mortgage application form. The next level of the hierarchy could be the section headers, for example Personal Information, Financials, etc. Each of those sections may further have subsections such as "Employment Information" or "Checking Accounts" for the Financials sections. There could be many levels of hierarchy depending on the structure and content of the document. The hierarchy aids in mapping since it offers a structured way to associate a specific field within the document. As illustrated in the form hierarchy structure of FIG. 4A, a mapping algorithm will more accurately map a Birthdate field 402/404 given the additional section information 406 that it's "Your Info" and category information 410 that it's for a College Scholarship Form. This decomposition can be performed by form mapping software for PDF files or web forms. More specifically, this is "decomposition" of the hierarchical structure which leads to better mapping, as described immediately above. The decomposition aspect involves breaking the document up into a hierarchy of sections. As an example, it is useful to determine the category of the document as the highest point in the hierarchy. Is it a medical intake form, college application form, or mortgage application form? One way to determine this is for the software to scrape keywords out of the document and categorize by the occurrence of those keywords. The result of this process is a unique set of terms for each field. For example, consider the block diagram of the hierarchical structure of two documents 400 and 450 illustrated in FIG. 4A and FIG. 4B, each with a field 402/404 called "BIRTHDATE." One document 400 is a college scholarship form and the other document 450 is a veterinarian form. To a person viewing these forms, the birthdate field 402/404 clearly refers to two different things. However, a conventional single-term form mapper will see the same term and attempt to fill the same value on both forms.

However, the automatic form mapper will look at each document's structure and assign a field name that is based on the field's hierarchical context within the form. Once we identified the form category 410/412, we could then identify sections 406/408, subsections, and finally the field name 402/404 itself. So what you end up with is a set of "keywords" that uniquely locate and identify that field's hierarchical context within the document. Going back to FIG. 4A, we could have a resulting set of keyword terms to identify the fieldname 402 as "College Scholarship Your Birthdate." This makes it much easier for an FFMI-enabled form mapper to correctly map the correct person's birthdate versus if the field name was simply named "birthdate." For example, the following example depicts these two documents each with the same "BIRTHDATE" field, as illustrated in the document hierarchy in FIGS. 4A and 4B.

The Automatic Form Mapper such as Form Field Mapping and Identification (FFMI) will determine the category type of each document ("College Scholarship Form," "Veterinarian New Client Form"), the section name ("Your Info," "Pet's Info"), and the field name ("Birthdate"). Using that information, each of the fields can be given a unique name that can be easily identified by a form filler to match against the appropriate values found in a database:

| FORM 1 BIRTHDATE: | "SCHOLARSHIP YOUR INFO BIRTHDATE" |
|---|---|
| FORM 2 BIRTHDATE: | "VETERINARIAN PETS INFO BIRTHDATE" |

Figure 5:
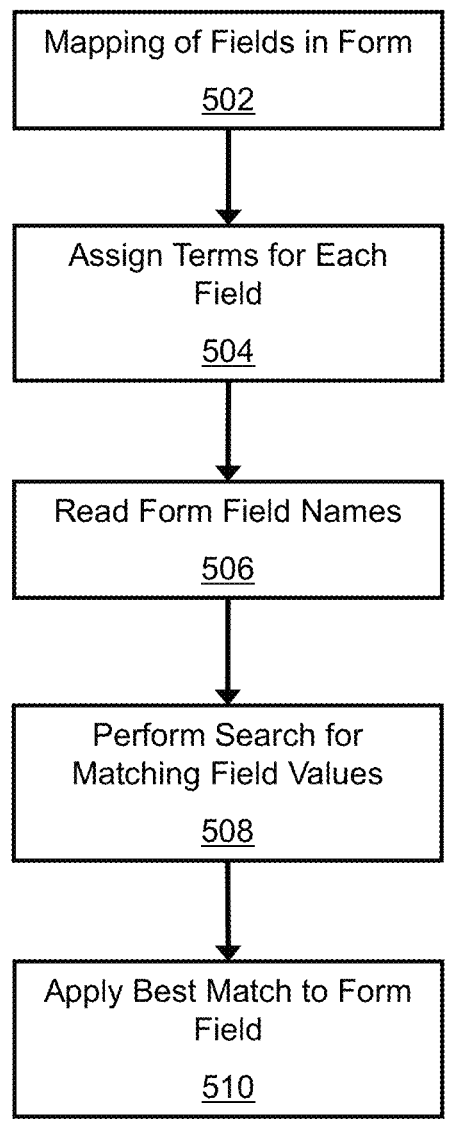
FIG. 5 is a flow chart illustrating a method of identifying a form field using multiple field terms, according to one embodiment.

One embodiment of a method of identifying, mapping and completing form fields is illustrated in FIG. 5. The method may be embodied on the system illustrated in FIG. 14 which is described in further detail below, but configured with at least one client machine 110 in communication with a server 106, where the server is responsible for receiving the form field names from the client machine 110 and querying one or more databases 108 to perform the best-fit match against the terms of the field name and the field names stored in the databases 108 with their corresponding field values.

In a first step 502, forms are either pre-mapped (such as PDF forms) or dynamically mapped (such as web forms) using a technique called Form Field Mapping and Identification (FFMI). Next, in step 504, the system assigns multiple relevant terms for each field within a document by decomposing the document's structure and identifying a field's hierarchical position within the document. It is possible that very simple forms could have fields that have only a single term for a field name.

In step 506, when a Multiple Term Mapping (MTM) based form filler needs to fill a field, it reads the form field name, for example "Child's Birth Date." The form filler sends this field name to the server connected with one or more user databases to perform a search (step 508) for the corresponding location within a user database profile containing the appropriate value for this field. A Scalable Machine Learning Framework could be used to perform this search.

In step 510, the value returned from this search is applied to the form field. This process may be repeated for all fields of the document. Once the search for the best and most appropriate fitting field for "Child's Birth Date" is completed on the server, its corresponding value in the server's database is returned back to the user's form. At this point the form filler simply needs to fill the field's value that it's currently working on with the value returned by the server.

II. Form Field Mapping and Identification

Disclosed herein are systems and methods for identifying and labeling form fields using machine learning algorithms. A form field mapping and identification engine identifies a form category using a machine learning classification algorithm, then determines and maps form labels to form fields using seeded values and optical scanning in order to produce an enhanced field name that incorporates a readable label associated with each field. Along with additional categorical information, the field labels are used to generate a set of terms for each form field that are used to identify content to be filled in the form with a high degree of accuracy.

Mapping form labels to form fields takes advantage of the fact that form labels tend to add descriptive information to the associated field, thereby making it easier for a mapping engine to map a field with a descriptive form label to a corresponding field in the database. The resulting "readable label" is therefore designed to benefit the mapping algorithm when mapping labels to fields, although the label is considered more readable to a human and is therefore referred to as a "human readable label" herein. This extra step of associating—or "mapping"—form labels to form fields is taken because many times the form labels are not bound to the form fields through the HTML code.

Figure 6:
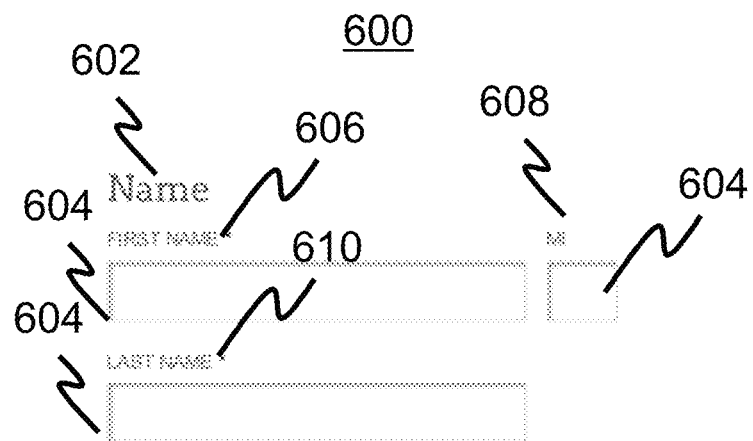
FIG. 6 is an illustration of a form with multiple fields associated with a name, according to one embodiment.

Form Field Mapping and Identification (FFMI) is a process where form fields of a document can be identified by descriptive terms such that a Multiple Term Mapping (MTM) based form filler may easily locate and fill the fields. Although most form fields are generally descriptive when viewed from a human perspective, the underlying code that represents the fields may be quite arbitrary. For example, FIG. 6 illustrates a typical form 600 containing a section title 602 and three fields 604 and corresponding field names: First Name 606, Middle Initial (MI) 608 and Last Name 610. The fields in this example are clearly marked with labels such that a user may readily fill the form.

However, a form filler program is not able to "read" labels in the same way as a human does. Form fillers must rely on the underlying code that generally does not use standardized form field names. We see the "FIRST NAME" label, but a form filler sees the internal program code for this same field which could be some arbitrary name such as "FIELD102." For example, an HTML code would look something like: <h2>FIRST NAME</h2>, <input type="text", name="FIELD102"/>. This is a big problem for form fillers because it becomes difficult to reliably write a value to a particular field (such as the FIRST NAME field) when the field is named something completely different. Up to now, there has not been a need for Web-based or PDF form designers to name fields with human readable internal names.

Figure 7:
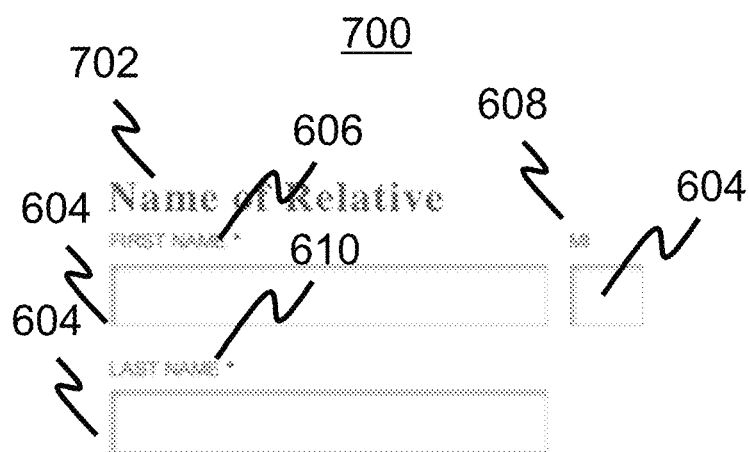
FIG. 7 is an illustration of the form with multiple fields associated with a name of a relative, according to one embodiment.

As will be described below, FFMI alters the internal field names from arbitrary single-use codes to a more meaningful name. The "name" can be as simple as matching the label, such as "FIRST NAME" in the above example, or the name can be a set of terms that accurately describe the field, such as "FIRST NAME CLOSEST RELATIVE" for the otherwise identical form fields 604 and corresponding field names 606, 608 and 610 illustrated in the form 700 in FIG. 7 which includes a different section name 702.

Any field on any form, PDF or Web-based, can be accurately identified given that there are sufficient terms describing it. FFMI can gather the context of the fields (for example, the section header "Name" 602 vs. "Name of Relative" 702) to assist in this goal. For example, the top level form category may be derived by the occurrences of certain keywords within the PDF document. Section names may be derived by the order and placement within the PDF file with respect to the related fieldname. In addition, FFMI considers the form category (medical vs. college, etc), field labels and other attributes to further identify the field. The aim of FFMI is to automatically generate a sufficiently unique set of terms to describe a given field. For example, a form filler will see a field named "FIRST NAME CLOSEST RELATIVE" instead of "FIELD103," and this makes filling the field with the correct value much easier.

FFMI changes the field names from an arbitrary name unique to the document to a collection of terms, which, although still unique to the document, now provide a meaningful description of the field's contents. Multiple terms may be used to more accurately describe a field, or, in very simple forms, fields could have only a single term for a field name.

As will be described in further detail below, FFMI uses the advanced concepts of a Scalable Machine Learning Framework and its advanced concepts to assign a set of descriptive terms to each field in a document. Current form fillers perform a strict one-for-one literal match between the field name in the form and the field name in its database containing the value to assign to the field. FFMI provides a way for Multiple Term Mapping (MTM)-based form fillers to read all of the terms assigned to a form field and perform a probabilistic best-fit for a similar set of terms in its database. There is no need to be restricted to a one-for-one exact match, which opens the door for more fields to be auto-filled more accurately and with greater relevancy.

Method of Mapping Forms

Figure 8:
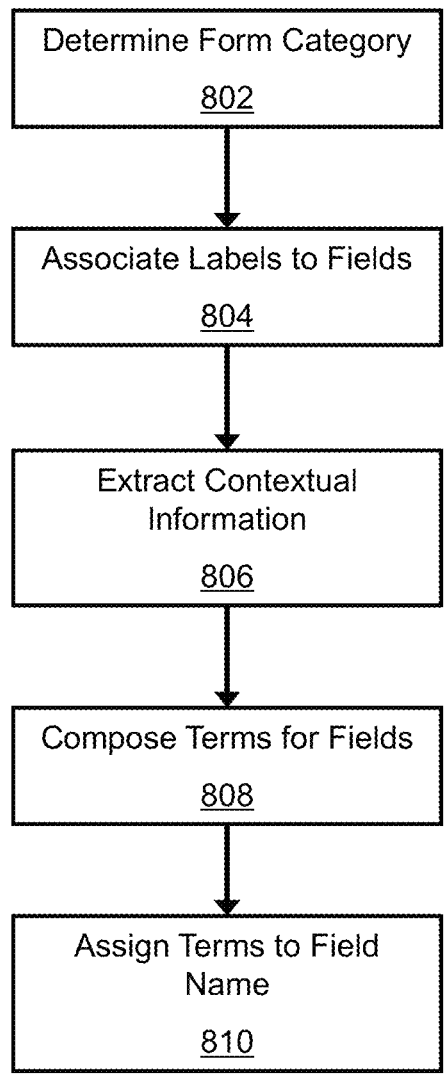
FIG. 8 is a flow chart illustrating a method of identifying and labeling form fields, according to one embodiment.

FIG. 8 illustrates one embodiment of a method of identifying and labeling form fields using machine learning. The exemplary method described herein is applicable for use with a portable document format (PDF) form, although it is applicable to other types of document forms, web-based forms or other fillable field documents, web pages, etc. In a first step 802, a form category is determined by scanning for keywords to identify the form as, for example, a college scholarship form or a pediatric new client form. A probabilistic algorithm is applied that takes the collection of keywords and determines the most likely category for the document. e.g. Pediatric New Client Form. By knowing the form category it becomes possible to identify which subset of form fields are relevant for the form. The benefit is higher accuracy in the form filling operation. For example, if a user's database has dozens of "birthdate" fields, the form category can help filter out the relevant fields. In a Pediatric form, for example, "birthdate" is likely to be a child's birthdate, thereby reducing the number of relevant database fields to match against.

The form category can be determined using a machine learning classification engine as applied to keywords extracted from the document, as will be described in further detail below.

Figure 9:
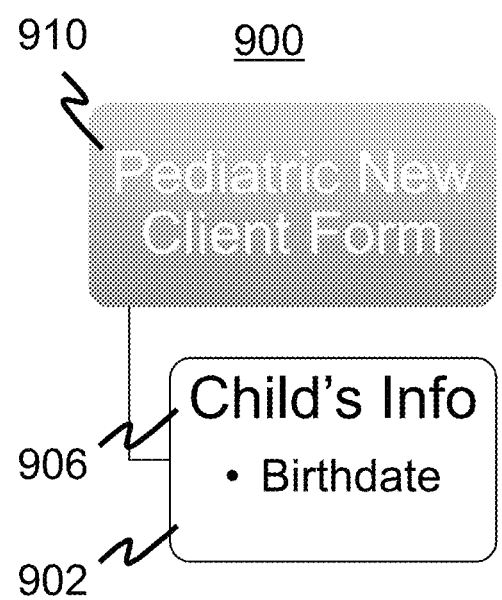
FIG. 9 is an illustration of a form field hierarchy, according to one embodiment.

In a second step 804, an association between form labels and form fields can be built, after which the field names can be renamed using a human readable label (as opposed to an arbitrary name and numerical code. The label may be associated to a field either by proximity, through an optical scanner approach, or by associating the HTML <label> element through the use of the "for-id" to match it to the corresponding <input> element. Further details of the steps for building the association between the form labels and form fields is described below. In a third step 806, contextual information can be extracted from the form. For example, an optical scanner may be used to identify section headers such as "Child's Info" 906 for the associated fields 902 in a pediatric new client form 910, as shown in FIG. 9. In another example, if there are other labels that may identify the containing section name or other parent sections, this could be used to identify context. For example, "child's Info" vs. "Parent's Info".

Next, in step 808, the gathered information from the above three steps (form category, field names and associations, and contextual information) can be used to compose a set of terms for each of the fields. One embodiment of the gathered information is illustrated by the hierarchy of form information in FIG. 9. If step 302 determines that the form is a "Pediatric New Client Form" and step 304 determines that a field label is "Birthdate," and step 306 determines the context as "Child's Info," then the set of terms for this field is: "PEDIATRIC CHILD'S INFO BIRTHDATE."

In step 810, this set of terms can be assigned to the field name and thus becomes the new "mapped" field name for this particular field. The terms contain all the information necessary for a Multiple Term Mapping (MTM)-based form filler to accurately look up a corresponding form value in a database of user information used to fill the form.

Method of Filling Online Forms

Figure 10:
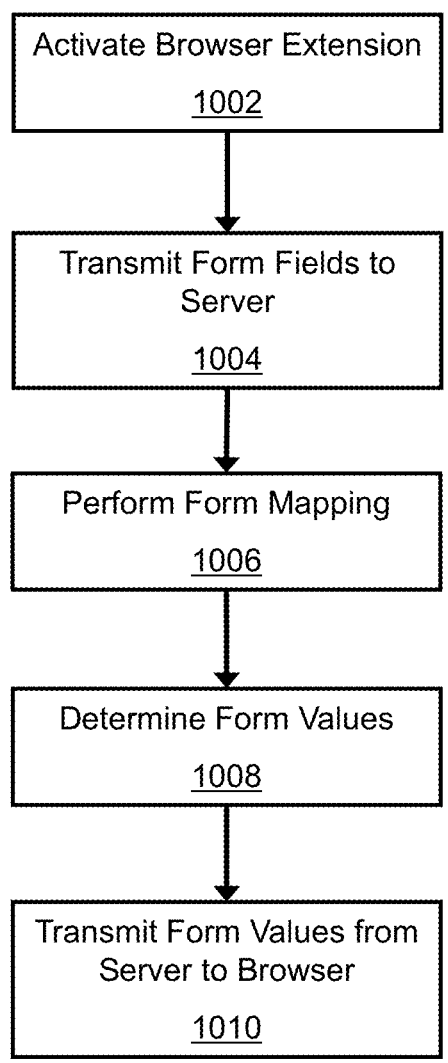
FIG. 10 is a flow chart illustrating a method of filling an online form, according to one embodiment.

FIG. 10 illustrates one embodiment of a method of identifying, labeling and filling an online form utilizing the method described in FIG. 8. The process is similar to the steps described in FIG. 8, except the fields are dynamically assigned terms when the extension is activated on a form page. In other words, the form's original fieldnames are not altered, as the system creates a temporary representation of the form in computer memory and operates on that temporary representation to "rename" the form fields using the FFMI methods described herein. Fields are dynamically assigned terms because the FFMI methods immediately perform the assignments on a logical copy of the form every time the form is called up by the user. A user viewing a webpage form through a browser application will first, in step 1002, activate a browser extension application within the browser to initiate the form filling process. The extension can be activated through the user's credentials (password, passphrase, etc), and allows access to the user's database. In step 1004, the browser application will transmit the form fields of the webpage to a remote server. The extension scrapes the form field names and sends them to the user's server instance. These form fields may be FFMI enhanced form fields that have been renamed using the dynamically assigned terms provided by the FFMI process. In step 1006, the remote server will perform the form mapping method described in FIG. 8 in order to identify information about the form and determine new field names and terms. Given the list of field names, the server scans the user's data for the corresponding fields. Using the MTM technology, the algorithm could match FFMI field names to the best fitting fields found on the server. Once the terms are assigned to the field names, the server determines values for the form fields in step 1008 by accessing one or more databases containing the user's profile information, then matching the field names and field terms with the user's information. The matching form values are then transmitted, in step 1010, from the remote server to the browser application, where the browser extension application operates to enter all of the field values into the respective fields in order to complete the online form. Essentially, when the user presses the "FILL" button in the browser extension menu, the server can fill values to the fields based on the underlying terms previously assigned to each field.

Determining a Form Category

Figure 11:
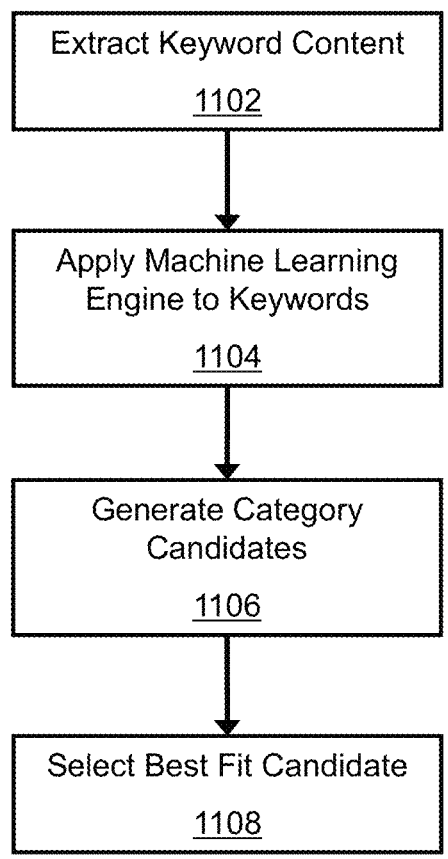
FIG. 11 is a flow chart illustrating a method of determining a form category, according to one embodiment.

FIG. 11 illustrates one embodiment of the method of determining a category of a form, as described generally above with regard to step 802 in FIG. 8. In a first step 1102, keyword content is extracted from the form. Next, in step 1104, a Machine Learning Classification engine, such as Apache Mahout (mahout.apache.org), is used to classify the keywords. Using a library of keywords, we would match the scraped keywords against the library. The algorithms to do this can range from a simple probability algorithm on up to more sophisticated machine learning classification engines. One non-limiting approach would be to use Bayes' formula to compute the conditional probabilities, although other formulas and algorithms may be used. The result of the machine learning algorithm is the generation of candidate categories and confidence values for each category in step 1106. Depending on the engine used in step 1104, there may be more than one good fitting category that the document fits within. To break the "tie" there may be other rules applied such as pre-selection criteria that may have been determined earlier. For example, if we are processing only Medicare forms today, that information could be helpful in the categorization process. The best fit candidate is then selected, in step 1108, as the form category. In one embodiment, the Machine Learning Classification engine will be trained with a cross-section of different documents in advance of its application. Additionally, additional sets of training data may be built and incorporated on a continuous basis with data that users input into forms and fields. Given the potential categories and any additional pre-selection criteria, a final determination is made and the form is categorized.

Associating Labels to Fields

Figure 12:
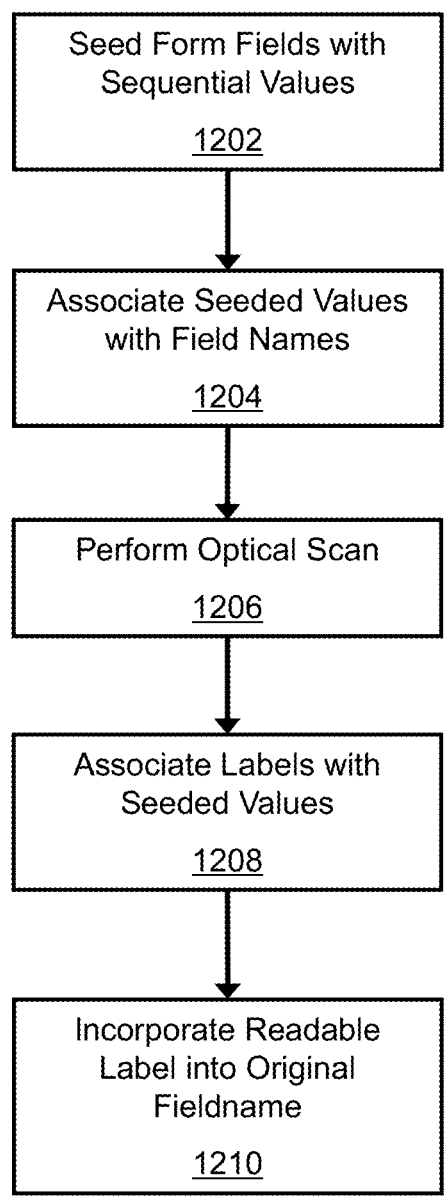
FIG. 12 is a flow chart illustrating a method of associating labels to fields, according to one embodiment.

FIG. 12 illustrates one embodiment of the method of associating form labels with form fields, as described generally above with regard to step 804 in FIG. 8. This process uses an optical scanner to identify the values in each of the form fields. The values are placed there by the software in an attempt to match the field against the label associated with the field. For example, let's say we have three fields labeled "First Name", "Middle Name", and "Last Name," and we want to properly name the underlying fields which may currently be arbitrarily named Field1, Field2, and Field3. This method is performed by using a technique where, in a first step 1202, the form fields are seeded with a sequential set of values and the form submitted to an analyzer. The software places a number in each of the fields: First Name will have a "1," Middle Name will have a "2" and Last Name will have a "3." The analyzer will associate the seeded values with the internal field names of the form in step 1204. The software will map each of the numeric values to the underlying (existing) field names: Field1=1, Field 2=2, Field3=3. In step 1206, an optical scanner will identify external (visible) field labels on the form, such that the scanner will see First Name=1, Middle Name=2, Last Name=3. In step 1208, the internal and external field labels will be associated with the seeded values. We now have two mappings: The underlying arbitrary fieldnames mapped to a number, and the user-friendly labels mapped to a number. From that, we can associate the labels to each of the underlying field names: Field1 is First Name, Field2 is Middle Name, and Field3 is Last Name. In step 1210, the fields are provided with new internal field names that are more easily mappable. Given the associations from step 708, we can rename the arbitrary fieldnames to names that are more easily mappable. Instead of Field1, Field2, Field3, the mapping algorithms will be able to use "First Name", "Middle Name", "Last Name". In other words, the end result is that each field name will be the name of the human readable label e.g. "BIRTHDATE" instead of some arbitrary internal field name "FIELD103."

III. Identifying Form Fields in Formless Forms

The various embodiments described herein are directed toward a form filler application that can locate and identify form fields found in various types of electronic forms, including so-called formless forms that are defined without <form> tags. Some common examples of electronic forms include checkout forms for online shopping, applications for loans, credit cards, health insurance, college and employment, government-mandated legal forms (e.g., divorce and bankruptcy filing), and forms required for or by businesses and business owners. In some embodiments, a user encounters an electronic form such as when the user loads or is directed to a webpage containing the electronic form. For example, a user, Alice, wants to apply for a credit card with ACME Bank. Through her web browser (e.g., Google Chrome®, Apple Safari®, Mozilla FireFox®), she accesses ACME Bank's website and pulls up the bank's online credit card application. In some embodiments, in order to populate each form field in an electronic form with the correct information, the form filler application must first locate every form field in the electronic form. In some embodiments, as in the case of conventional electronic forms, form fields can be found by locating the <form> tags in a HTML document.

It is to be understood that although the various techniques herein are described with respect to HTML documents, the same techniques are applicable to and can be used with other types of documents, including, without limitation, PDF files, that employ the same or similar mechanisms to define, represent, or otherwise indicate at least some constituent components or elements, such as interactive input fields.

Figure 1:
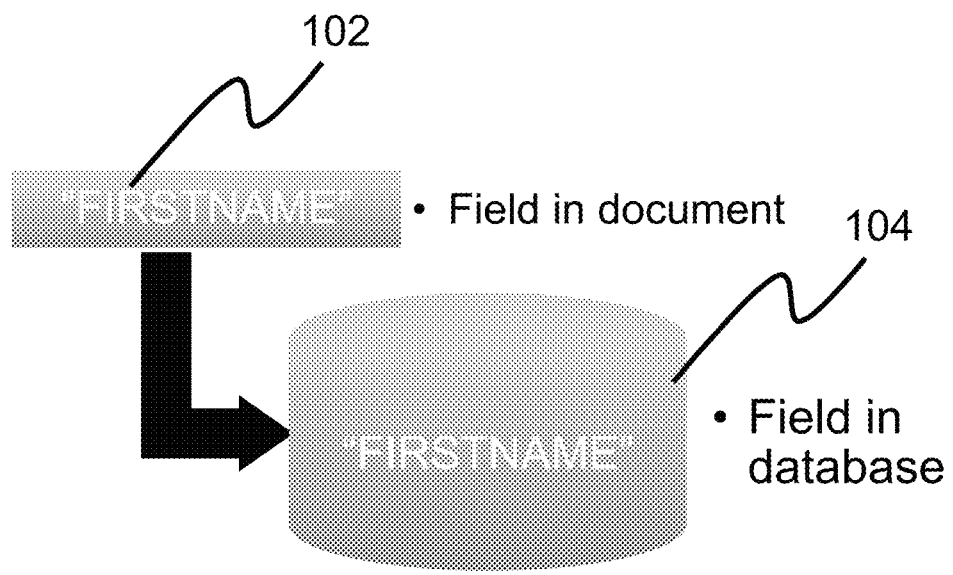
FIG. 1 is a block diagram illustrating a single term mapping function, according to one embodiment.
Figure 13A:
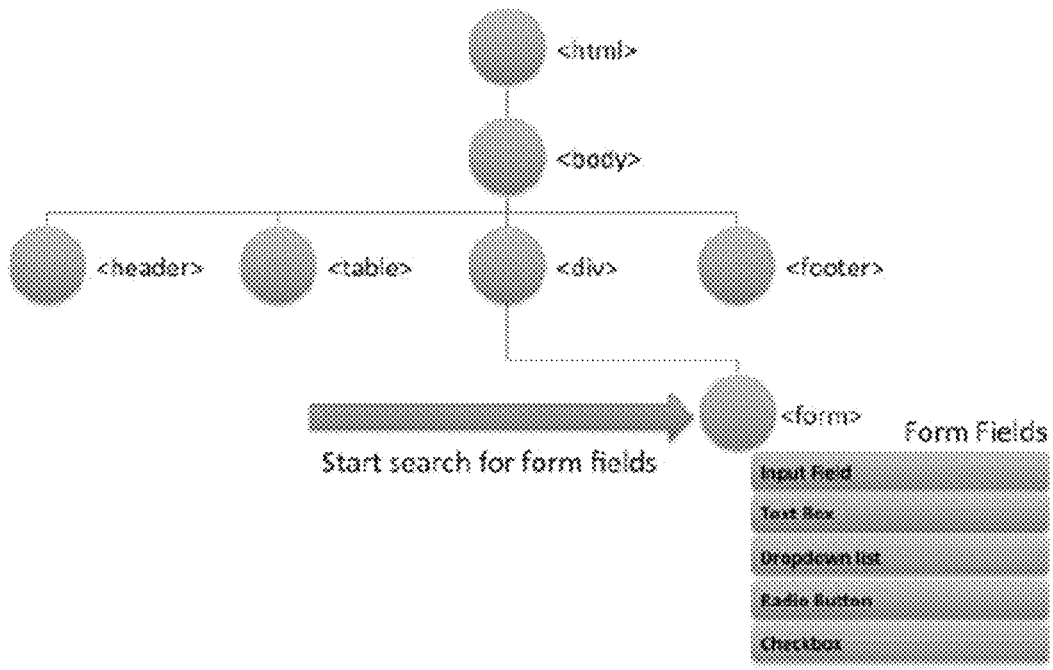
FIG. 13A is a diagram illustrating an example of a HTML hierarchy associated with a webpage that contains a conventionally defined electronic form.

FIG. 13A is a diagram illustrating an example of a HTML hierarchy associated with a webpage, Webpage A 1300 (shown in FIG. 13C), that contains a conventionally defined electronic form. Webpage A is constructed using a conventional <form> based design, so form fields are demarcated using <form> tags. In some embodiments, every element in Webpage A (e.g., header, table, division, form, form fields, footer) can be found by traversing the tags in the HTML hierarchy. In particular, FIG. 1A shows, subordinate to the <body> tag and as a child of the <div> tag, is a <form> tag. According to the HTML hierarchy expressed in FIG. 13A, the body of Webpage A includes a division or section that contains an electronic form. Since Webpage A is constructed using a <form> based design, every form field in the electronic form (e.g., input field, text box, dropdown list, radio button, and checkbox) can be found under the <form> tag. Thus, FIG. 1 shows that in embodiments where the webpage is a conventional webpage (i.e., <form> based design), the search for form fields can start at the <form> tag. In various embodiments, the form filler application conducts an initial search to detect the presence of a <form> tag in the HTML hierarchy of a webpage. In various embodiments, the presence of a <form> tag indicates that the electronic forms in the webpage are conventional electronic forms (i.e., not formless forms). As such, in some embodiments, if an initial search locates a <form> tag, then the form filler application starts the search for form fields at the <form> tag.

However, in some embodiments, the electronic form is a so-called "formless form" which lacks the <form> tags. For instance, ACME's web developers may have created the online credit card application as a formless form. As such, in some embodiments, the webpage containing the form is not defined to include any <form> tags, which would normally indicate the presence of a form on the webpage and demarcate the precise location of the form fields.

Figure 13B:
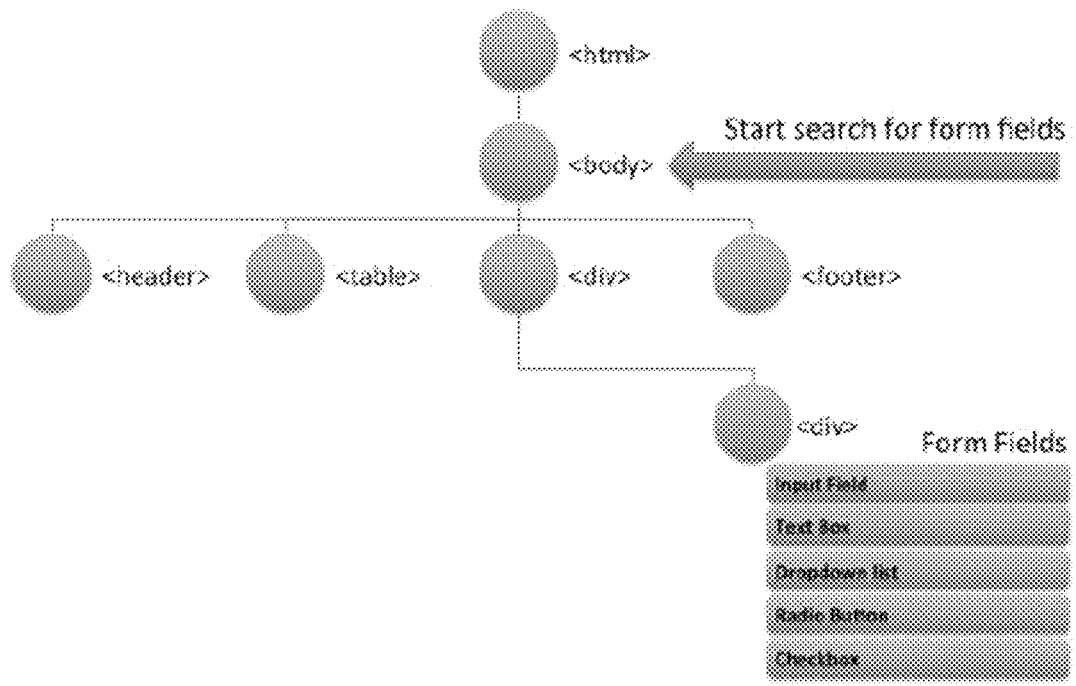
FIG. 13B is a diagram illustrating an example of a HTML hierarchy associated with a webpage that contains a formless electronic form.

FIG. 13B is a diagram illustrating an example of a HTML hierarchy associated with a webpage, Webpage B, that contains a formless electronic form. So unlike Webpage A, Webpage B is constructed according to a formless design. Otherwise stated and as can be seen in FIG. 1B, <form> tags are absent from the HTML definition of a webpage, such as Webpage B, that contain one or more formless forms. In some embodiments, the techniques described herein provide for the ability to accurately locate every form field contained in the electronic form. In particular, in various embodiments, the techniques described herein provide for the ability to accurately locate every form field, even those that are contained in a formless form and without the benefit of <form> tags. In some embodiments, in order to locate every form field in a formless form, the form filler application's search for form fields begin at a tag that is higher in the HTML hierarchy. For example, in some embodiments, the search for form fields start at the <body> tag. As FIG. 13B shows, the form fields on Webpage B are grouped under a <div> tag instead of the conventional <form> tag. Those form fields are overlooked by conventional form filler applications because these applications limit their search for form fields to finding elements grouped under a <form> tag. However, in various embodiments, the techniques described herein expand the breadth of the search for form fields, including but not limited to starting the search farther up the HTML hierarchy (e.g., the <body> tag) and by adding search parameters to look for actual form fields (e.g., input field, text box, dropdown list, radio button, and checkbox). In some embodiments, the form filler application conducts an initial search to detect the presence of a <form> tag in the HTML hierarchy of a webpage, such as Webpage B. In some embodiments, the presence of a <form> tag indicates that the webpage contains a conventionally defined electronic form. In those embodiments, the search for form fields can start at the <form> tag. On the other hand, in some embodiments, the initial search can fail to locate a <form> tag. In those embodiments, the webpage can contain a formless form or no form fields at all. Thus, in some embodiments, if an initial search is unable to locate a <form> tag, the form filler application starts the search for form fields at a higher HTML tag in the HTML hierarchy. For instance, in some embodiments, if an initial search indicates the absence of a <form> tag, then the search for form fields begins at the <body> tag in the HTML hierarchy. In some embodiments, in order to locate every form field in a formless form, the form filler application performs an exhaustive search of the HTML hierarchy of the webpage and looks for multiple different types of form fields, including but not limited to input fields, text boxes, dropdown menus, radio buttons, and checkboxes.

In some embodiments, after locating every form field, the form filler application must also correctly identify the individual form fields. This step is significant because it enables the form filler application to populate the form fields with the appropriate information (e.g., first name, last name, address, social security number, etc.). As discussed earlier, under normal circumstances, form fields are all assigned certain attributes values (e.g., form field ID, form field name) that allow them to be distinctive and identifiable within a document. For example, an input box for entering an individual's first name may be associated with a unique form field ID such as "firstNameID." Alternatively or in addition, the form field may be associated with a unique form field name such as "firstNameNAME." In fact, form field ID and form field name are common examples of form field attributes. Conventional form filler applications rely on one or both of the form field ID and form field name to identify individual form fields.

However, a growing number of websites are starting to assign arbitrary and rotating values to form field attributes. Some websites now routinely change form field ID values. For instance, below is the HTML definition for a typical form field wherein a user can enter his or her first name. The first name form field is defined with an input type (e.g., text), a form field name (e.g., firstNameNAME), and a form field id (e.g., firstNameID).

```
<input type="text" name="firstNameNAME" id="firstNameID"/>
```

Now suppose this first name form field belongs to a form found on a website that rotates and randomizes form field IDs. During one visit to the website or upon loading the webpage containing the form, the HTML code for the first name form field looks like this:

```
<input type="text" name="firstNameNAME" id="fNID_3378"/>
```

When the page is reloaded, or during a subsequent visit to the website, the HTML code for the same form field is changed to this:

```
<input type="text" name="firstNameNAME" id="fNID_9909"/>
```

Even if a conventional form filler application is able to correctly identify the first name form field initially (i.e., when the form field ID has a value of "fNID_3378"), it will inevitably fail to recognize and fill the form field on the subsequent occasion when the value of the form field ID is changed to "fNID_9909."

It is certainly also conceivable to assign rotating values to other form field attributes, such as form field name. As a result, exclusive reliance on either form field name or form field ID may not provide a reliable or consistent means for identifying form fields. In some cases, form field name may not be available at all. For instance, although form field name is required for <input> fields in conventional <form> based electronic forms, it can be left out of formless forms. Where the form field name attribute is required, a web designer can opt to use the form field ID attribute to uniquely identify the form fields while randomizing the form field name. Alternately, the web designer may decide to randomize the form field IDs and use the form field name attribute as the unique identifier instead. In order to overcome this increasingly common practice, in some embodiments, the form filler application takes a dynamic and adaptable approach in selecting which form field attributes to use since, depending a variety of factors, some tend to be more reliable than others in correctly identifying form fields.

In some embodiments, in taking a dynamic and adaptable approach, the form filler application consults a prescribed precedence in order to determine which form field attribute should be relied upon to uniquely and consistently identify form fields. In some embodiments, the prescribed precedence that is applicable to an electronic form can depend on the type of electronic form. Otherwise stated, which form field should be prioritized in form field identification can depend on whether the webpage containing the electronic form was designed with or without traditional <form> tags. In a traditional <form> based design, it is more likely for the form field name attribute to be assigned unique values. Thus, in some embodiments, the form filler application will use the form field name attribute to identify form fields in conventional electronic forms before resorting to the form field ID attribute. On the other hand, for webpages that are created using a formless design (e.g., form fields are grouped without <form> tags), it is more likely that the form field name attribute is either left out or randomized. In practice, the software will scan first for the <form> tag. If it is present, then it will use it. Otherwise the algorithm will apply the "formless" approach. Some documents may have a combination of form and formless forms. One approach to handle that situation is to perform an initial pre-scan of the document to make a determination for the case where there is at least one formless form and thereby the "formless" algorithm would be applied. In some embodiments where the form filler application attempts to identify form fields in a formless form, the form filler application will identify individual form fields based on the form field ID attribute first. In addition, in some embodiments, every type of form field can have its own set of precedence rules. In other words, what form field attribute is more likely to generate a reliable identification can also depend on what type of form field is being identified. As one example, radio buttons are almost always more reliably identified based on the form field name and not the form field ID.

In some embodiments, in order to select a reliable form field attribute to identify form fields, the form filler application performs a series of validity checks in addition to or instead of relying on a prescribed precedence as described earlier. For example, the validity checks can include, but is not limited to, a determination of whether a particular form field attribute (e.g., form field name) is properly defined (e.g., not null). In the example HTML code shown below, the input field can be reliably identified through the form field name attribute since that attribute is properly defined.

```
<input type="text" name="firstNameNAME" id="fNID_3378"/>
```

In some embodiments, as part of the series of validity checks, the form filler application will attempt a cursory check to determine if the same form has been encountered in the past. For example, in some embodiments, the form filler application can search one or more storage locations or media (e.g., a memory store, a server, or a database) for prior data, including prior form field attribute values. In some embodiments, the one or more storage locations or media are remote (e.g., a remote memory store, a remote server, or a remote database). Therefore, in some embodiments, the form filler application determines whether it has already encountered the same form in the past based at least in part on remote data. This is accomplished by performing field-level checks which compare either the name or ID attribute with the field names on the server and see if it exists. If not, the form is new. In some embodiments, data (e.g., form field attribute values) associated with different electronic forms that have been processed previously is stored. Thus, checking for previously stored values allows the form filler application to determine whether an electronic form is designed with rotating form field attribute values. For example, the form filler application can detect rotating form field attribute values by comparing form field attribute values associated with an electronic form it is currently processing to the previously stored form field attribute values for the same form.

In some embodiments, the form filler application further utilizes the comparison between current and historical electronic form data to detect potential online fraud. For example, the form filler application can determine whether an electronic form has been changed to include new form fields. In some embodiments, the form filler application is configured to look for the addition of specific types of form fields (e.g., personal and financial data inputs) as indicators of potential fraud. For example, the form filler application can recognize a possible fraudulent transaction if it detects that a Little League signup form suddenly has added form fields for social security and bank account.

In some embodiments, if the series of validity checks fail with respect one form field attribute, the form filler application will resort to a different form field attribute. For example, if the validity checks fail with respect to the form field name attribute, the form filler application will then attempt to use the form field ID attribute to identify the form fields in a form. In some embodiments, the form filler application can look to other form field attributes in addition to form field name and form field ID. For example, the form filler application can use, in addition or instead, the "for" form field attribute that is typically associated with the form field ID attribute.

Figure 16A:
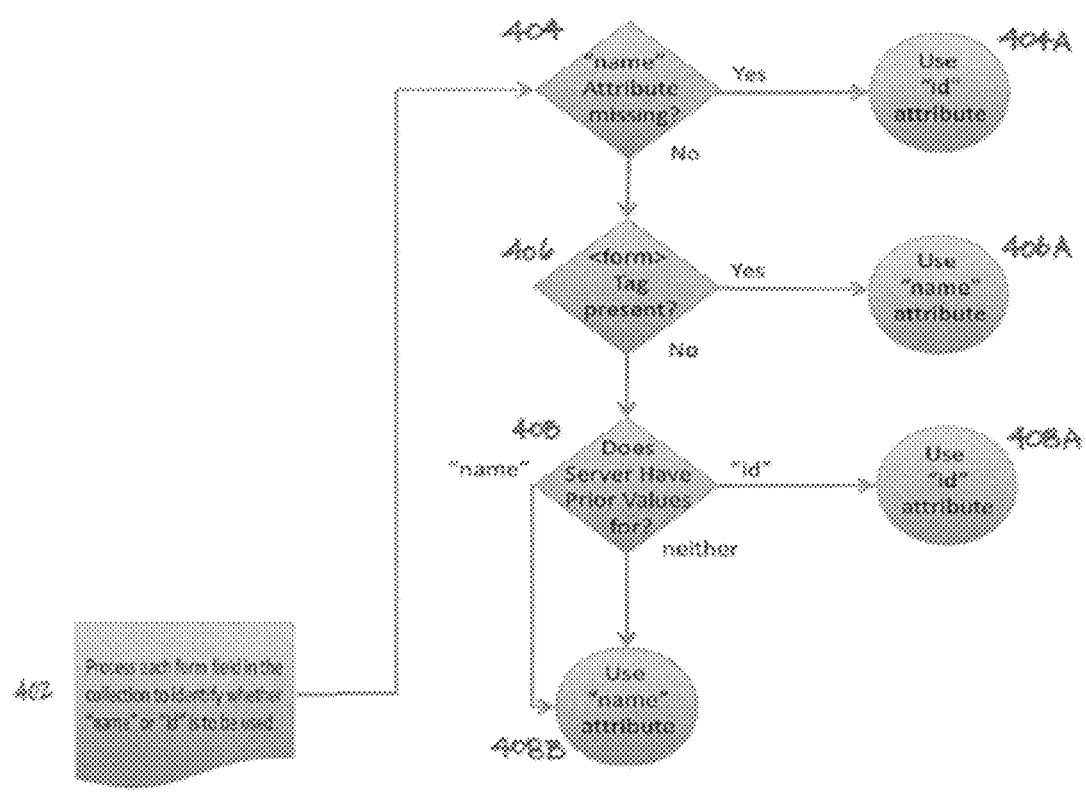
FIG. 16A is a flowchart illustrating an embodiment of a process for identifying form fields in an electronic form.

In the various embodiments described herein, the form filler application may use a dynamic algorithm to test whether a form field attribute is present, valid (e.g., not null), and is associated with a previously stored value. The flow of such an algorithm is illustrated in FIG. 16A. The dynamic nature of the algorithm centers on whether the "name" or "id" attribute is used and whether the form is formless or not. In some embodiments, adaptive or dynamic form field identification allows the form filler application to overcome the randomization and rotation measures that frustrate other conventional form filler applications.

Figure 14:
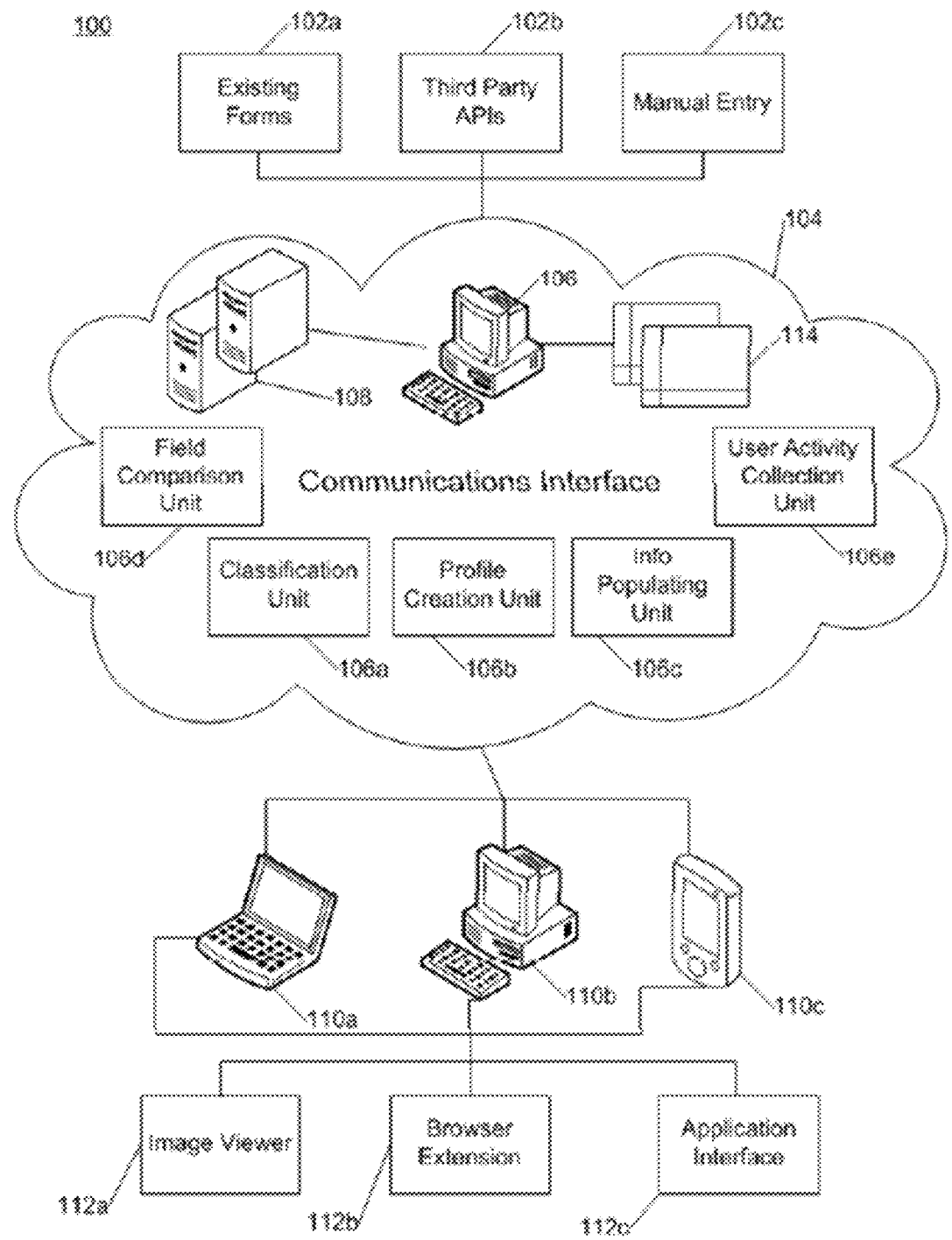
FIG. 14 is a diagram illustrating a system for locating, identifying, mapping and completing form fields in electronic forms that is used in various embodiments described herein.

FIG. 14 illustrates an embodiment of a System 100 for locating, identifying, mapping and completing form fields in electronic forms according to the embodiments described throughout this specification. Information is obtained from one or more information sources 102a-c, such as existing forms 102a, third party application interfaces 102b or manual user entry 102c. The information is then transmitted to a communications interface 104, where it is then classified by a server 106 and stored in one or more databases 108 as a user profile of the user's information. The communications interface 104 may be in a local area network (LAN) with the information sources 102 or at a remote location from the information sources 102 through connection via the Internet or other wide area network (WAN). The communications interface 104 may also include one or more information processing units within the server 106 to process the collected information, including a classification unit 106a which classifies the information to identify fields applicable to the information and values for the fields; a profile creation unit 106b which creates a user profile with the classified information; and an information populating unit 106c which populates at least one form field of an electronic form or database by matching the at least one form field with the classified information. A field comparison unit 106d and a user activity collection unit 106e may also be included, the functions of which will be described further below. Any of the aforementioned units may be located within separate servers or within a single server, depending on the design of the overall system. The user, through any type of device 110a-c, may then request that one or more forms 112 be completed using the information in their profile. Any type of device may be utilized by the user, including, without limitation, a laptop computer 110a, desktop computer 110b, or a portable electronic device 110c such as a tablet or smartphone. The user can interact with the communications interface 104 through the device 110 to complete one or more forms 112a-c, such as an image viewer 112a, a form displayed in an internet-browser application 112b, or a form displayed via an application 112c running on the portable electronic device 110c. Forms may also be displayed directly in a browser window via HTML5-CSS3 or via an application 112c interfacing with the server 106 through one or more graphical user interfaces (GUIs) 114 produced by the server 106 that are displayed on the device 110c. As demonstrated herein, the forms may be populated directly on the user's device, through a form filler application that can be deployed as a browser extension, add-on browser application, or as an application programming interface (API) interacting with a third party service or application.

Figure 15A:
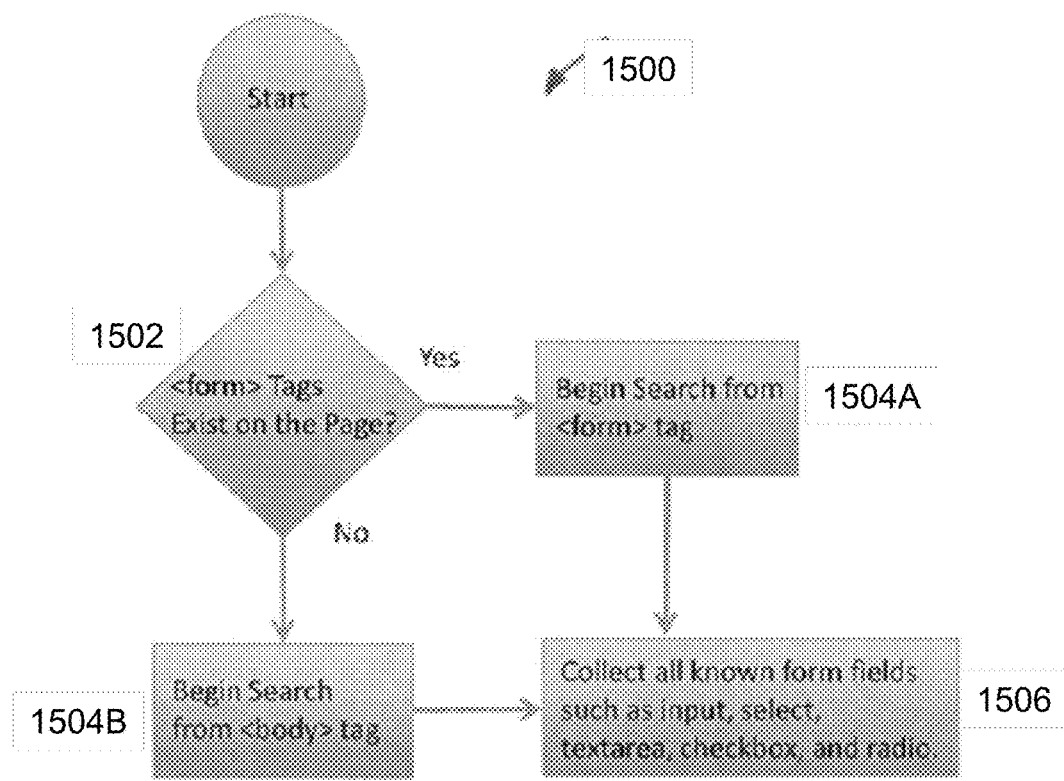
FIG. 15A is a flowchart illustrating an embodiment of a process for locating form fields in an electronic form.

FIG. 15A is a flowchart illustrating an embodiment of a Process 300 for locating form fields in an electronic form, while FIG. 15B illustrates an exemplary HTML code which identifies the form tag before and after the form. In a formless form, the <form> tag 1510 is missing. In that case, our algorithm looks at the entire document for the form fields. Existing form fillers appear to give up if the <form> tag is missing. One thing we do differently is that we don't give up, but search the entire document regardless if the <form> tag is missing. In some embodiments, Process 1500 is performed by the form filler application in order to locate form fields in a webpage. At 1502, it is determined whether a webpage is constructed using a traditional <form> based design. For instance, the form filler application conducts an initial search for a <form> tag. At 1504A, in the event that the form filler application is able to locate a <form> tag, then a search for form fields is conducted starting at the <form> tag. Alternately, at 1504B, in the event that the form filler application fails to locate a <form> tag after the initial search, a search for form fields is conducted starting at a tag that is higher up in the HTML hierarchy. In some embodiments, the search for form fields starts at the <body> tag. For example, if the form filler application encounters a webpage constructed without the use of <form> tags, the form filler application searches for various form fields starting at the <body> tag. In some embodiments, the search for form fields can start at the <html> tag. At 1506, all known form fields found during the search are collected. For example, the search can yield form fields such as input field, text box, dropdown list, radio button, and checkbox. As discussed below, in some embodiments, the form filler application collects these various types of form fields are for further processing, including performing adaptive form field identification of each individual form field. FIG. 15C illustrates one embodiment of the completed form 1520.

FIG. 16A is a flowchart illustrating an embodiment of a Process 400 for identifying form fields. In various embodiments, Process 400 is performed by the form filler application. In various embodiments, Process 400 is performed by the form filler application upon completion of Process 300. In some embodiments, by performing Process 300, the form filler application is able to locate and collect all the form fields that are in an electronic form (whether <form> based or formless). At 402, all known form fields are processed in order to determine which form field attribute should be used in identifying the form fields. In some embodiments, the form filler application attempts to determine which form field attribute would most reliably identify all the form fields. In some embodiments, the form filler application determines whether to use form field name or form field ID. At 404, it is determined whether one or more form field attributes are absent. For example, the form filler application can determine that the form field name attribute is missing (e.g., null value). In the event that one of the form field attribute is missing, at 404A, an alternate form field attribute is used. Thus, in the example where the form field name attribute is determined to be missing, then the form filler application uses the form field ID attribute instead. In the event that one or more form field attributes are not determined to be missing, then at 406, it is determined whether a <form> tag is present on the webpage. In some embodiments, the form filler application determines whether the electronic form is <form> based or formless. This could be done, in some embodiments, by recalling or consulting the result of the search performed at 302 of the Process 300 described with respect to FIG. 3. In some embodiments, the form filler application determines which form field attribute to rely upon based on whether the electronic form is <form> based or formless. Since <form> based electronic forms are more likely to have static and reliable form field name values, at 406A, the form field name attribute is used to identify the form fields if the form is determined to be <form> based. However, if the electronic form is determined to be formless, at 408, a search for previously stored or prior values is conducted. For example, the form filler application can search one or more storage locations or media including but not limited to a memory store, a server, or a database. It is to be understood that in some embodiments, prior values are stored at one or more remote storage locations or media (i.e., a remote memory store, a remote server, or a remote database). That is, in some embodiments, the form filler application searches for, accesses, and otherwise utilizes remote data. If there are prior values for the form field ID attribute, then at 408A, the form field ID attribute is used to identify the various form fields in the electronic form. At 408B, if there are prior values for the form field name attribute, or if there are no prior values at all found on the server or the database, then the form field name attribute is used instead to identify the form fields in the electronic form. FIG. 16B illustrates one embodiment of a completed form 1600 using the rotating ids filled in.

Details of the systems and methods are provided further herein with regard to the specific components and features.

IV. Computer-Implemented Embodiment

Figure 17:
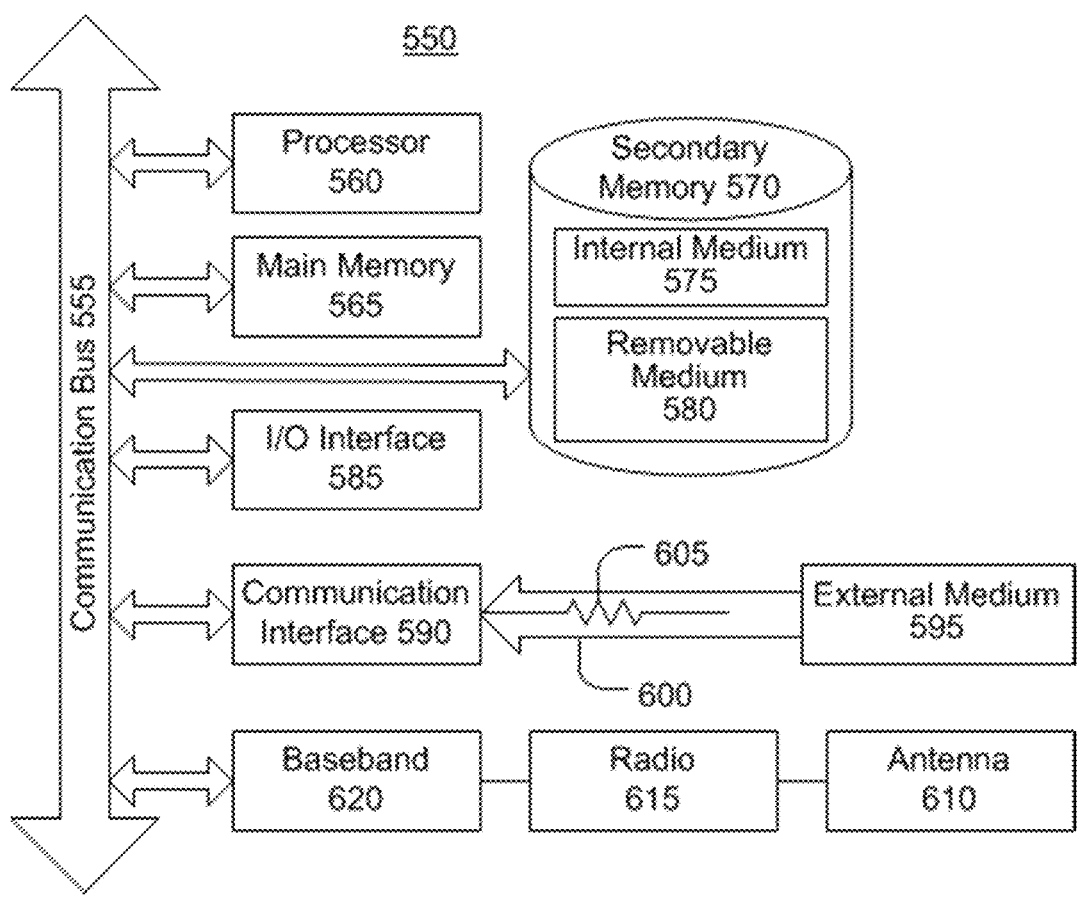
FIG. 17 is a block diagram that illustrates an embodiment of a computer/server system upon which an embodiment of the inventive methodology may be implemented.

FIG. 17 is a block diagram illustrating an embodiment of a wired or wireless System 550 that may be used in connection with various embodiments described herein. For example the System 550 may be used to implement one or more components of the communications interface 104 described with respect to FIG. 14. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

System 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of matching and completing form fields in an electronic form, the method comprising the steps of:
   receiving at least one field name of at least one form field on the electronic form, the at least one field name comprising multiple terms, the electronic form comprising a plurality of form fields, a plurality of field names associated with the plurality of form fields, and a plurality of readable labels;
   decomposing the electronic form into a hierarchical structure in descending order of form category type, section headers, and subsections, wherein the section headers and subsections each comprise one or more form fields of the plurality of form fields;
   scanning the plurality of readable labels for keywords in the electronic form;
   applying a probabilistic algorithm to the keywords to identify a form category type for the electronic form;
   building associations between the plurality of readable labels and the plurality of form fields to determine a readable label of the plurality of readable labels for the at least one field name associated with the at least one form field;
   extracting contextual information from the electronic form based on at least one of a section header corresponding to the at least one form field and a subsection corresponding to the at least one form field;
   composing a set of terms for the at least one form field based on the identified form category type, the determined readable label, and the contextual information, wherein the set of terms is not the same as the readable label;
   performing a best-fit search of a database of field names using the set of terms to identify a best-fit field name of the database of field names for the at least one form field; and
   transmitting a field value corresponding to the best-fit field name for completing the at least one form field of the electronic form.

2. The method of claim 1, wherein the field name of the form field is different than the best-fit field name in the database of field names and corresponding field values.

3. The method of claim 1, wherein the best-fit search utilizes an algorithm to identify the best-fit field name.

4. The method of claim 1, wherein the best-fit search improves over time based on continuously updated knowledge of user entries of field values into form fields.

5. The method of claim 1, wherein the multiple terms of the field name are determined based on a hierarchical structure of the electronic form.

6. The method of claim 1, wherein the field names are renamed using human readable labels based on the association between the readable labels and the at least one form field.

7. The method of claim 1, further comprising:
   identifying a subset of form fields relevant to the electronic form based on the form category type.

8. The method of claim 1, wherein the form category type is identified based in part on a frequency of occurrence of one or more keywords.

9. The method of claim 1, wherein building associations comprises:
   generating a first mapping based on associating a sequential set of seeded values with a subset of the plurality of field names corresponding to a subset of the plurality of form fields;
   generating a second mapping based on associating the sequential set of seeded values with a subset of plurality of readable labels corresponding to the subset of the plurality of form fields; and
   associating each of the subset of the plurality of readable labels to each of the subset of the plurality of field names based on the first and second mappings.

10. A system for matching and completing form fields in an electronic form, the system comprising:
   a client device accessing the electronic form comprising a plurality of form fields, a plurality of field names associated with the plurality of form fields, and a plurality of readable labels;
   a server in communication with the client device which receives a field name of a form field on the accessed electronic form, the field name comprising a multiple terms;
   a content database in communication with the server, wherein the content database stores a plurality of pre-defined field names and corresponding field values;
   wherein the server is configured to:
      decompose the electronic form into a hierarchical structure in descending order of form category type, section headers, and subsections, wherein the section headers and subsections each comprise one or more form fields of the plurality of form fields;
      scan the plurality of readable labels for keywords in the electronic form;
      apply a probabilistic algorithm to the keywords to identify a form category type for the electronic form;
      build associations between the plurality of readable labels and the plurality of form fields to determine a readable label of the plurality of readable labels for the received field name of the form field;
      extract contextual information from the electronic form based on at least one of a section header corresponding to the received form field and a subsection corresponding to the received form field;
      compose a set of terms for the at least one form field based on the identified form category type, the determined readable label, and the contextual information, wherein the set of terms is not the same as the readable label; and
      perform a best-fit search of the field names in the content database using the set of terms to identify a best-fit field name from the pre-defined field names of the content database and a field value corresponding to for the best-fit field name for the received form field, which is then transmitted to the client device for filling into the received form field.

11. The system of claim 10, wherein the field name of the form field is different than the best-fit field name in the content database of pre-defined field names and corresponding field values.

12. The system of claim 10, wherein the best-fit search utilizes an algorithm to identify the best-fit field name.

13. The system of claim 10, wherein the best-fit search improves over time based on continuously updated knowledge of user entries of field values into form fields.

14. The system of claim 10, wherein the multiple terms of the field name are determined based on a hierarchical structure of the electronic form.

15. The system of claim 10, wherein the field names are renamed using human readable labels based on the association between the readable labels and the at least one form field.

16. The system of claim 10, wherein the server is configured to:
identify a subset of form fields relevant to the electronic form based on the form category type.

17. A method of identifying and labeling fields in an electronic form, the method comprising the steps of:
decomposing the electronic form into a hierarchical structure in descending order of form category type, section headers, and subsections, the electronic form comprising a plurality of form fields, a plurality of field names associated with the plurality of form fields, and a plurality of readable labels, wherein the section headers and subsections each comprise one or more form fields of the plurality of form fields;
determining a form category of the electronic form by applying a probabilistic algorithm using the hierarchical structure of the electronic form and keywords extracted from the electronic form;
associating the plurality of readable labels with the plurality of form fields to determine a readable label of the plurality of readable labels for at least one field name associated with at least one form field;
extracting contextual information from the form using an optical scanner based on at least one of a section header corresponding to the at least one form field and a subsection corresponding to the at least one form field;
composing at least one term for each form field in the electronic form based on the determined form category, the determined readable label, and the contextual information; and
assigning the composed at least one term for each of the form fields to each of the field name.

* * * * *